United States Patent
Kim et al.

(10) Patent No.: US 10,625,553 B2
(45) Date of Patent: Apr. 21, 2020

(54) SUSPENSION SYSTEM FOR VEHICLE INCLUDING COMPOSITE LEAF SPRING

(71) Applicants: HYUNDAI MOTOR COMPANY, Seoul (KR); KIA MOTORS CORPORATION, Seoul (KR)

(72) Inventors: Tae Hyung Kim, Jeollabuk-do (KR); Seung Hyun Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 198 days.

(21) Appl. No.: 15/824,757

(22) Filed: Nov. 28, 2017

(65) Prior Publication Data

US 2019/0047344 A1     Feb. 14, 2019

(30) Foreign Application Priority Data

Aug. 9, 2017 (KR) .................. 10-2017-0101109

(51) Int. Cl.
| | |
|---|---|
| B60G 11/113 | (2006.01) |
| B60G 11/40 | (2006.01) |
| B60G 11/34 | (2006.01) |
| B60G 11/08 | (2006.01) |
| B60G 5/03 | (2006.01) |
| B60G 11/04 | (2006.01) |

(52) U.S. Cl.
CPC .............. *B60G 11/113* (2013.01); *B60G 5/03* (2013.01); *B60G 11/04* (2013.01); *B60G 11/08* (2013.01); *B60G 11/40* (2013.01); *B60G 2202/112* (2013.01); *B60G 2202/143* (2013.01); *B60G 2206/70* (2013.01); *B60G 2300/02* (2013.01)

(58) Field of Classification Search
CPC . B60G 3/16; B60G 5/03; B60G 5/053; B60G 11/02; B60G 11/04; B60G 11/10; B60G 11/113; B60G 11/12; B60G 11/34; B60G 11/40; B60G 2202/112; B60G 2202/116; B60G 2204/121
See application file for complete search history.

(56) References Cited

U.S. PATENT DOCUMENTS

| | | | | |
|---|---|---|---|---|
| 3,586,307 | A * | 6/1971 | Brownyer | B60G 11/10 267/47 |
| 3,968,958 | A * | 7/1976 | Huchette | B29C 70/345 267/47 |
| 4,508,325 | A * | 4/1985 | Marsh | B60G 11/113 267/149 |

(Continued)

FOREIGN PATENT DOCUMENTS

| | | |
|---|---|---|
| EP | 0419208 A2 | 3/1991 |
| JP | S60-065922 A | 4/1985 |

(Continued)

*Primary Examiner* — Barry Gooden, Jr.
(74) *Attorney, Agent, or Firm* — Morgan, Lewis & Bockius LLP

(57) ABSTRACT

A suspension system for a vehicle includes: a composite leaf spring having a protective member which covers an outer surface of the composite leaf spring; and an abrasion-preventing pad coupled to the composite leaf spring and shielding. The protective member and the abrasion-preventing pad are disposed at a portion of the composite leaf spring to which a U-bolt is mounted.

6 Claims, 6 Drawing Sheets

(56) References Cited

U.S. PATENT DOCUMENTS

| | | | | |
|---|---|---|---|---|
| 4,519,590 A * | 5/1985 | Wells | B60G 11/113 | 267/149 |
| 4,562,998 A * | 1/1986 | Ward | B60G 11/12 | 267/260 |
| 4,598,900 A * | 7/1986 | Yamamoto | B29C 53/562 | 267/149 |
| 4,630,804 A * | 12/1986 | Fesko | B60G 11/113 | 264/149 |
| 4,637,595 A * | 1/1987 | Mishima | B60G 11/113 | 267/149 |
| 4,684,110 A * | 8/1987 | Sale | B60G 11/113 | 267/148 |
| 4,801,129 A * | 1/1989 | Wells | B60G 11/113 | 267/158 |
| 4,894,108 A | 1/1990 | Richard et al. | | |
| 4,895,350 A * | 1/1990 | Schoof | B60G 11/113 | 267/52 |
| 4,969,634 A * | 11/1990 | Bellingham | F16F 1/3686 | 267/260 |
| 9,050,870 B2 | 6/2015 | Wilson et al. | | |
| 2007/0267790 A1 * | 11/2007 | Furman | B60G 11/107 | 267/36.1 |
| 2007/0267836 A1 * | 11/2007 | Furman | B60G 9/003 | 280/124.17 |
| 2008/0258361 A1 * | 10/2008 | Wen | B60G 9/003 | 267/52 |
| 2010/0044991 A1 * | 2/2010 | Luna | B60G 9/003 | 280/124.175 |
| 2011/0221105 A1 * | 9/2011 | Henksmeier | B60G 9/003 | 267/52 |
| 2014/0327196 A1 * | 11/2014 | Hummelt | B60G 11/08 | 267/52 |
| 2014/0353936 A1 * | 12/2014 | Preijert | B60G 9/003 | 280/124.116 |
| 2015/0343875 A1 * | 12/2015 | Spiegel | B60G 11/02 | 280/5.515 |
| 2018/0172100 A1 * | 6/2018 | Jang | F16F 1/3683 | |
| 2019/0009628 A1 * | 1/2019 | Oh | B60G 5/053 | |
| 2019/0017882 A1 * | 1/2019 | Oh | G01L 1/044 | |
| 2019/0084642 A1 * | 3/2019 | Alfano | F16F 1/18 | |

FOREIGN PATENT DOCUMENTS

| | | |
|---|---|---|
| KR | 10-1602388 B1 | 3/2016 |
| KR | 10-2017-0041019 A | 4/2017 |

* cited by examiner

-PRIOR ART-

-PRIOR ART-

SUSPENSION SYSTEM FOR VEHICLE INCLUDING COMPOSITE LEAF SPRING

CROSS-REFERENCE TO RELATED APPLICATION

This application claims the benefit of priority to Korean Patent Application No. 10-2017-0101109, filed on Aug. 9, 2017, in the Korean intellectual. Property Office, the disclosure of which is incorporated herein by reference.

TECHNICAL FIELD

The present disclosure relates to a suspension system for a vehicle including a composite leaf spring, and more particularly, to a suspension system for a vehicle including a composite leaf spring, which is capable of improving the abrasion resistance of a portion composite leaf spring to which a U-bolt is mounted, thereby maintaining a large axial force of the U-bolt.

BACKGROUND

A large truck, such as a dump truck, has a two-shaft structure for supporting the rear wheels in order to evenly support a load, particularly while traveling on a rough unpaved road.

A rear-wheel suspension system of a large truck, which has a two-shaft structure for supporting the rear wheels, includes a pair of rubber springs, which are mounted to a front rear-wheel axle and a rear rear-wheel axle, and a leaf spring, which extends in the forward-and-backward direction such that two opposite ends thereof are connected to the rubber springs.

A trunnion base, which includes a trunnion shaft, is provided at the middle in the longitudinal direction of the leaf spring. The trunnion base is coupled to a vehicle body frame, and a U-bolt saddle (an under saddle or a lower saddle) is rotatably coupled to the trunnion shaft and is coupled to the middle portion of the leaf spring, together with a spring bracket (an upper saddle), by fastening a U-bolt and a nut, in order to fixedly support the middle portion of the leaf spring.

The leaf spring may be constituted by multiple steel plates, or may alternatively be embodied as a composite leaf spring, which is formed in a unitary body containing glass fiber or carbon fiber. The leaf spring, which is constituted by multiple steel plates, is advantageous in terms of high durability for a given price, and the composite leaf spring is advantageous in terms of reduction in weight and improvement of fuel efficiency.

The composite leaf spring, which is formed of a mixture of glass fiber and resin, is vulnerable to friction and thus has a shortcoming of low abrasion resistance. Therefore, the composite leaf spring, which is vulnerable to friction, cannot be manufactured using multiple plates like a steel leaf spring, but is formed in a unitary body.

In particular, if a portion of the composite leaf spring to which the U-bolt is mounted is excessively worn, the axial force, i.e. the clamping force, of the U-bolt greatly decreases. As the axial force of the U-bolt excessively decreases, a larger torsional force is applied to the composite leaf spring, and thus, the durability of the composite leaf spring greatly decreases, which entails the likelihood of an accident.

The information disclosed in this Background of the Invention section is only for enhancement of understanding of the general background of the invention and should not be taken as an acknowledgement or any form of suggestion that this information forms the prior art already known to a person skilled in the art.

SUMMARY

The present disclosure has been made in view of the above problems, and it is an object of the present disclosure to provide a suspension system for a vehicle including a composite leaf spring, which is capable of maintaining a large axial force of the U-bolt by improving the abrasion resistance of a portion of a composite leaf spring to which a U-bolt is mounted, thereby increasing the durability of the composite leaf spring.

In accordance with an exemplary embodiment of the present disclosure, a suspension system for a vehicle includes: a composite leaf spring having a protective member which covers the outer surface of the composite leaf spring; and an abrasion-preventing pad coupled to the composite leaf spring and shielding the protective member. The protective member and the abrasion-preventing pad are disposed at a portion of the composite leaf spring to which a U-bolt is mounted.

The protective member may be formed of an aramid fabric material and may be integrally stacked on each of the top surface and the bottom surface of the composite leaf spring when the composite leaf spring is manufactured using a mixture of glass fiber and resin.

The abrasion-preventing pad may be formed of a polyamide material having high abrasion resistance, and may include an upper pad and a lower pad. The upper pad and the lower pad may be coupled to the composite leaf spring in order to respectively shield the top surface and the bottom surface of the composite leaf spring and may be connected to each other such that the connecting portions therebetween are positioned on the side surfaces of the composite leaf spring.

The upper pad may include a base portion covering the top surface of the composite leaf spring and a side cover portion bent and extending from the base portion to cover each of the side surfaces of the composite leaf spring, and the lower pad may include a base portion covering the bottom surface of the composite leaf spring and a side cover portion bent and extending from the base portion to cover each of the side surfaces of the composite leaf spring. One of the side cover portion of the upper pad and the side cover portion of the lower pad may be provided with a clamping protrusion, and the remaining one thereof may have a clamping recess formed therein. The upper pad and the lower pad may be connected to each other through coupling of the clamping protrusion and the clamping recess.

The upper pad and the lower pad may be connected to each other using only the clamping protrusion and the clamping recess, and portions other than the clamping protrusion and the clamping recess of the upper pad and the lower pad may be spaced apart from each other in order to allow thermal expansion in response to a change in temperature.

The base portion of the upper pad may have an upper protrusion for preventing slippage of the upper pad, and the base portion of the lower pad may have a lower protrusion for preventing slippage of the lower pad. When the U-bolt is mounted to the composite leaf spring, the upper protrusion may be inserted into an insertion hole formed in a spring bracket and the lower protrusion may be inserted into an insertion hole formed in a U-bolt saddle so as to prevent slippage of the upper pad and the lower pad.

The base portion of the upper pad and the base portion of the lower pad may be formed in the shape of rectangles that extend in the longitudinal direction of the composite leaf spring, so as to respectively cover relatively large areas of the top surface and the bottom surface of the composite leaf spring, and may have rounded corners in order to prevent the composite leaf spring from being damaged when the composite leaf spring is twisted.

BRIEF DESCRIPTION OF THE DRAWINGS

The above and other objects, features and other advantages of the present disclosure will be more clearly understood from the following detailed description taken in conjunction with accompanying drawings, in which.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Figure 1:
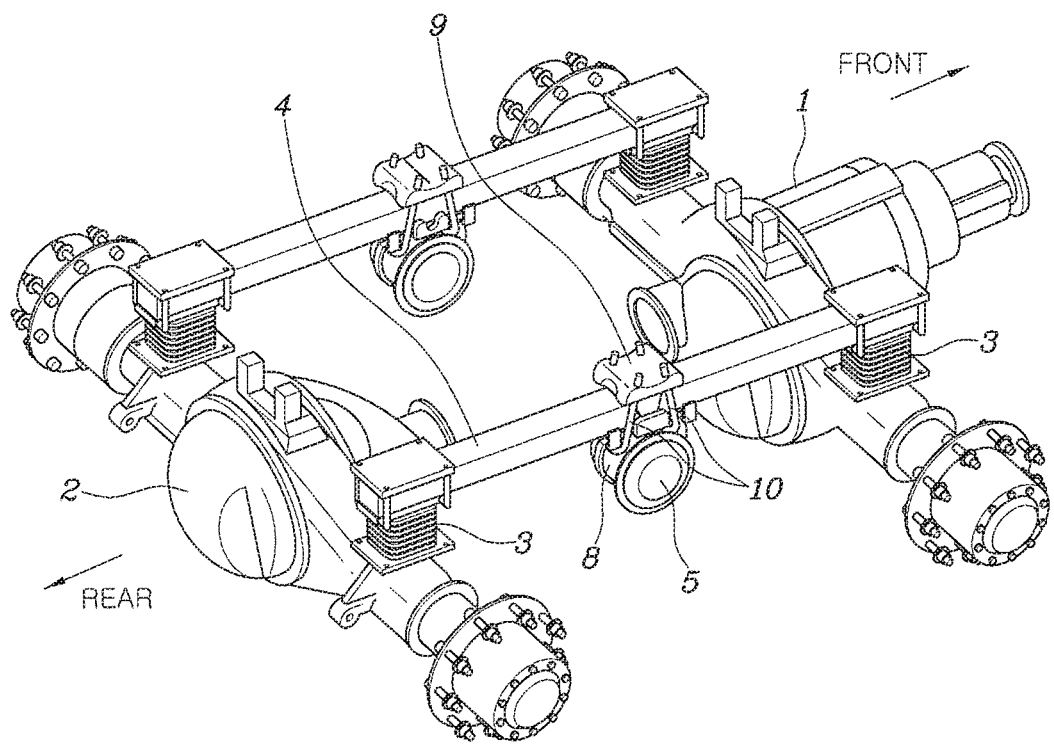
FIGS. 1 and 2 are views of a conventional suspension system for a two-shaft structure for supporting rear wheels, which includes a composite leaf spring.
Figure 2:
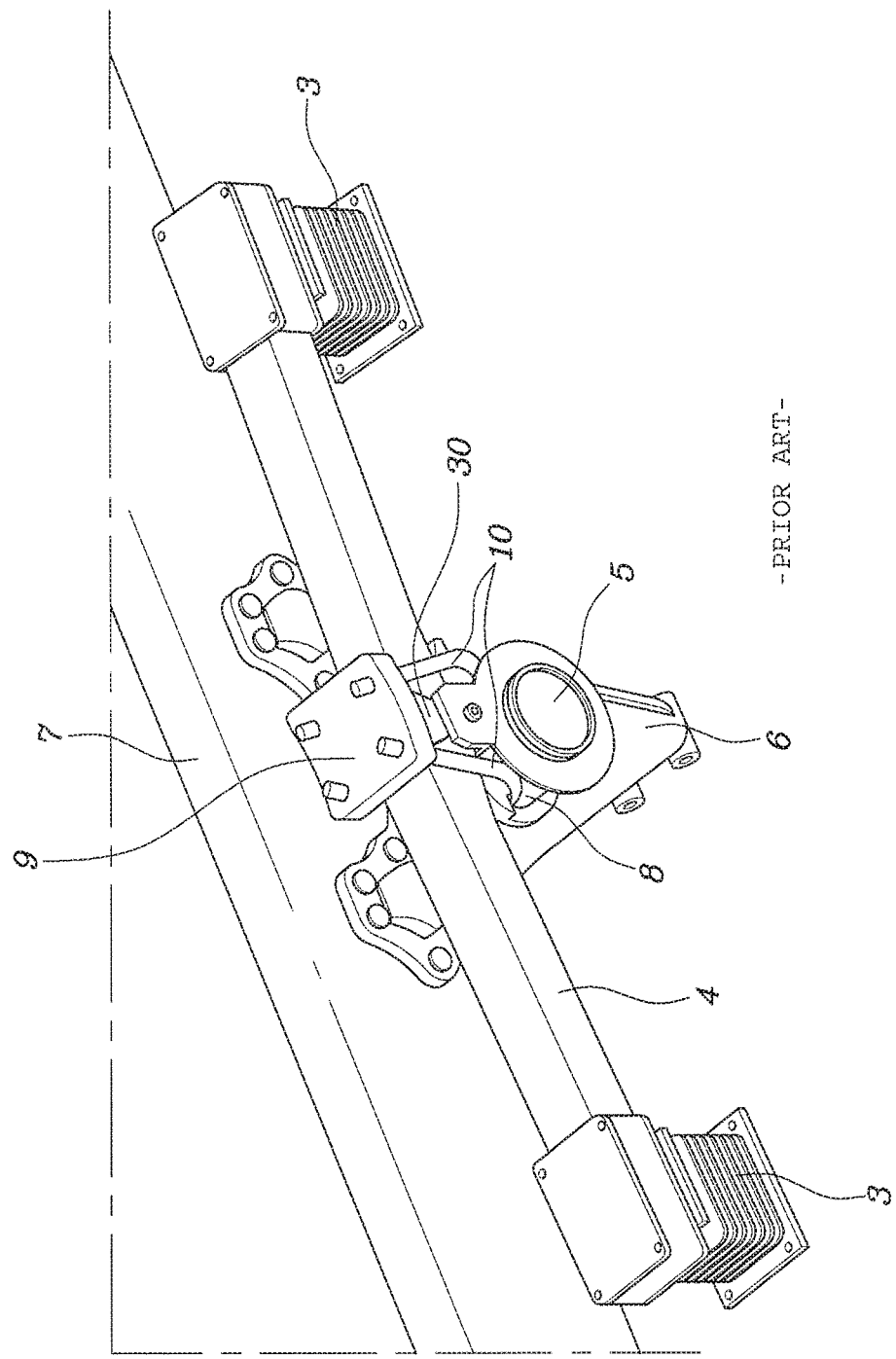

A conventional rear-wheel suspension system of large truck, which has a two-shaft structure for supporting the rear wheels, as shown in FIGS. 1 and 2, includes a pair of rubber springs 3, which are mounted to a front rear-wheel axle 1 and a rear rear-wheel axle 2, and a composite leaf spring 4, which extends in the forward-and-backward direction so that two opposite ends thereof are connected the rubber springs 3.

The composite leaf spring 4 is formed in a unitary body using a mixture of unidirectional glass fiber and epoxy resin.

A trunnion base 6, which includes a trunnion shaft 5, is provided at the middle in the longitudinal direction of the composite leaf spring 4. The trunnion base 6 is coupled to a vehicle body frame 7, and a U-bolt saddle 8 is rotatably coupled the trunnion shaft 5 and is coupled to the middle portion of the composite leaf spring 4, together with a spring bracket 9, by fastening a U-bolt and a nut, in order to fixedly support the middle portion of the composite leaf spring 4.

Compared with a leaf spring constituted by multiple steel plates, the composite leaf spring 4 is advantageous in terms of reduction in weight and improvement of fuel efficiency. However, the composite leaf spring 4 is vulnerable to friction and thus has a shortcoming of low abrasion resistance.

In particular, the composite leaf spring 4 having low abrasion resistance has a problem in that, if a portion thereof to which the U-bolt 10 is mounted is excessively worn, the axial force, i.e. the clamping force, of the U-bolt 10 greatly decreases. As the axial force of the U-bolt 10 decreases, a larger torsional force is applied to the composite leaf spring 4, and thus, the durability of the composite leaf spring 4 greatly decreases, which entails the likelihood of an accident.

Figure 3:
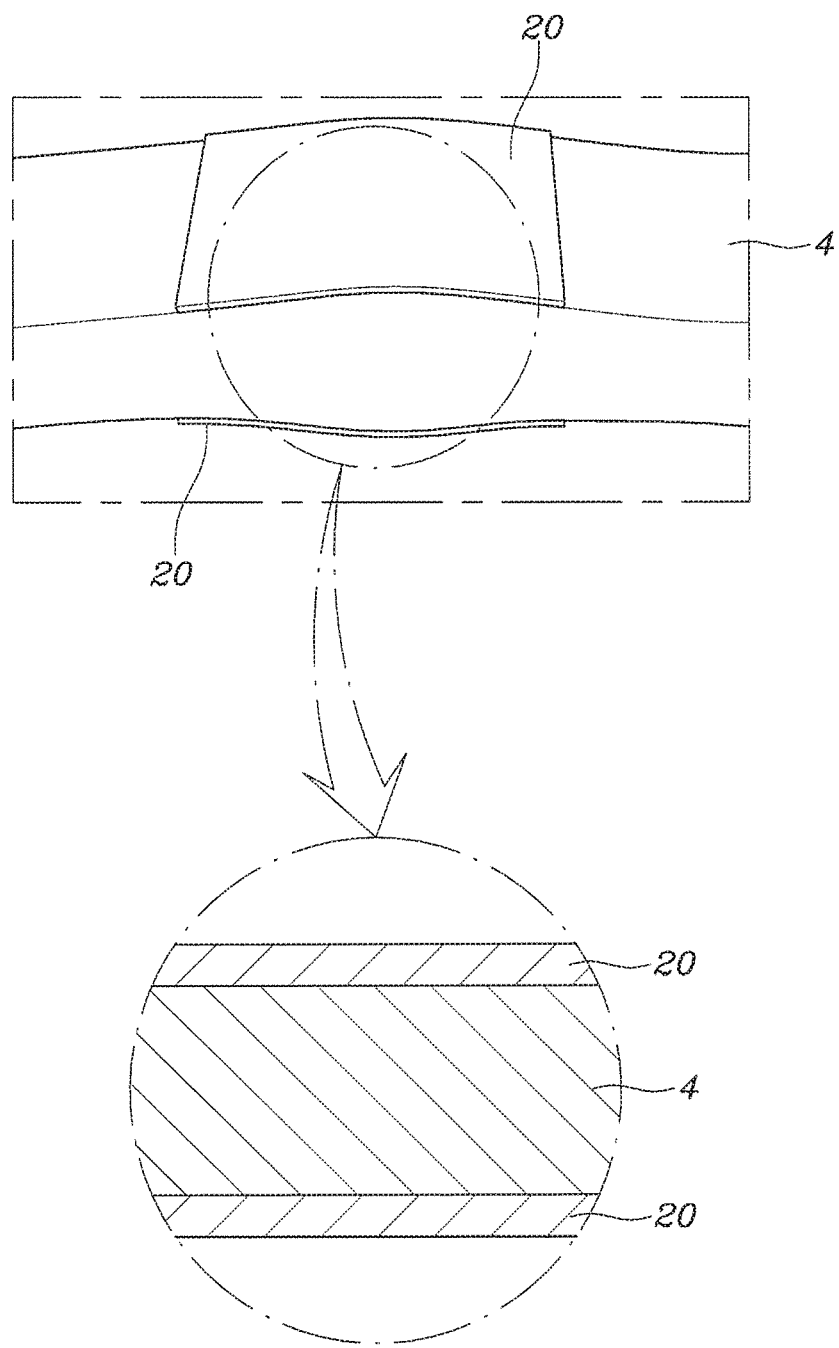
FIG. 3 is a view for explaining a protective member according to an exemplary embodiment of the present disclosure.
Figure 4:
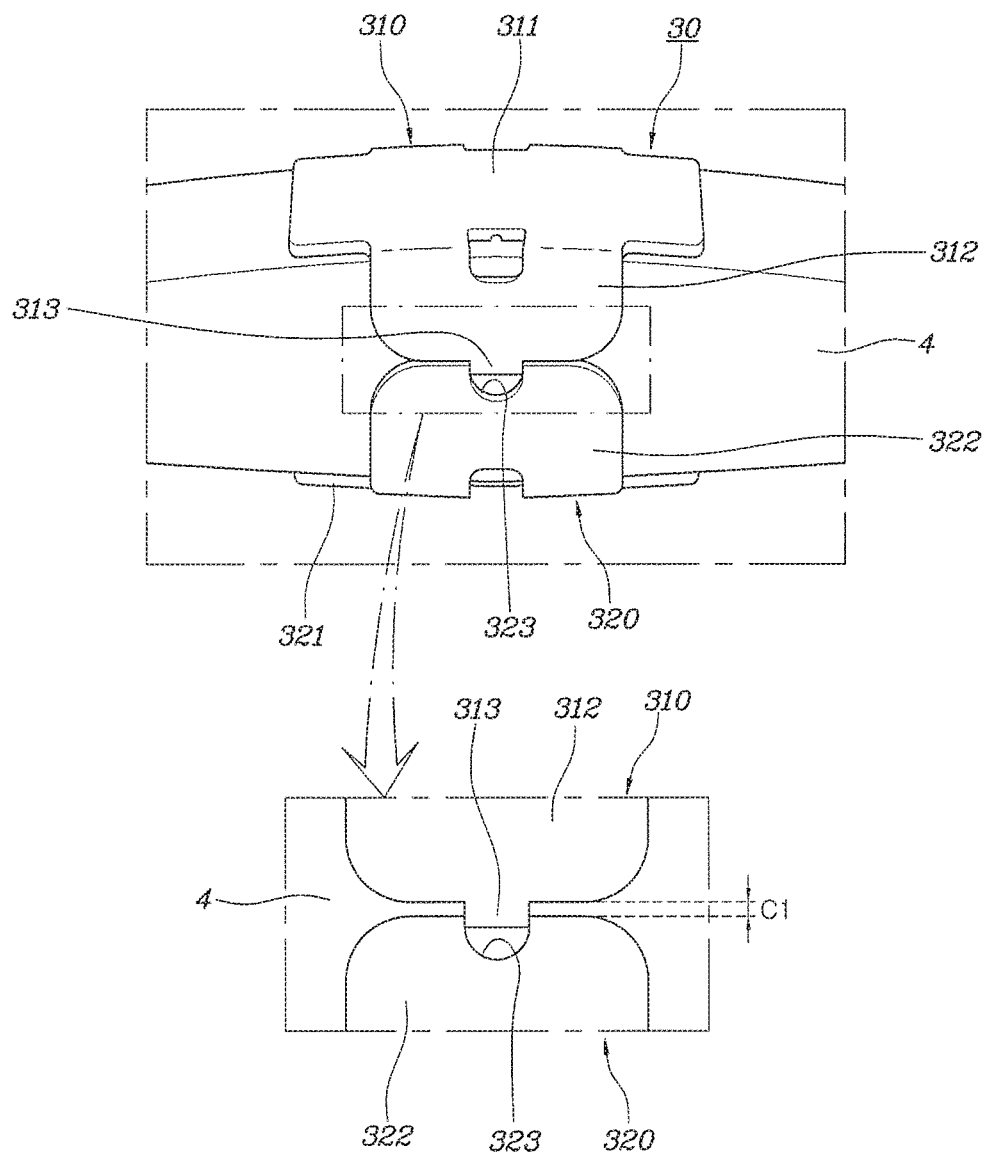
FIG. 4 is a view for explaining an abrasion-preventing pad according to an exemplary embodiment of the present disclosure.
Figure 5:
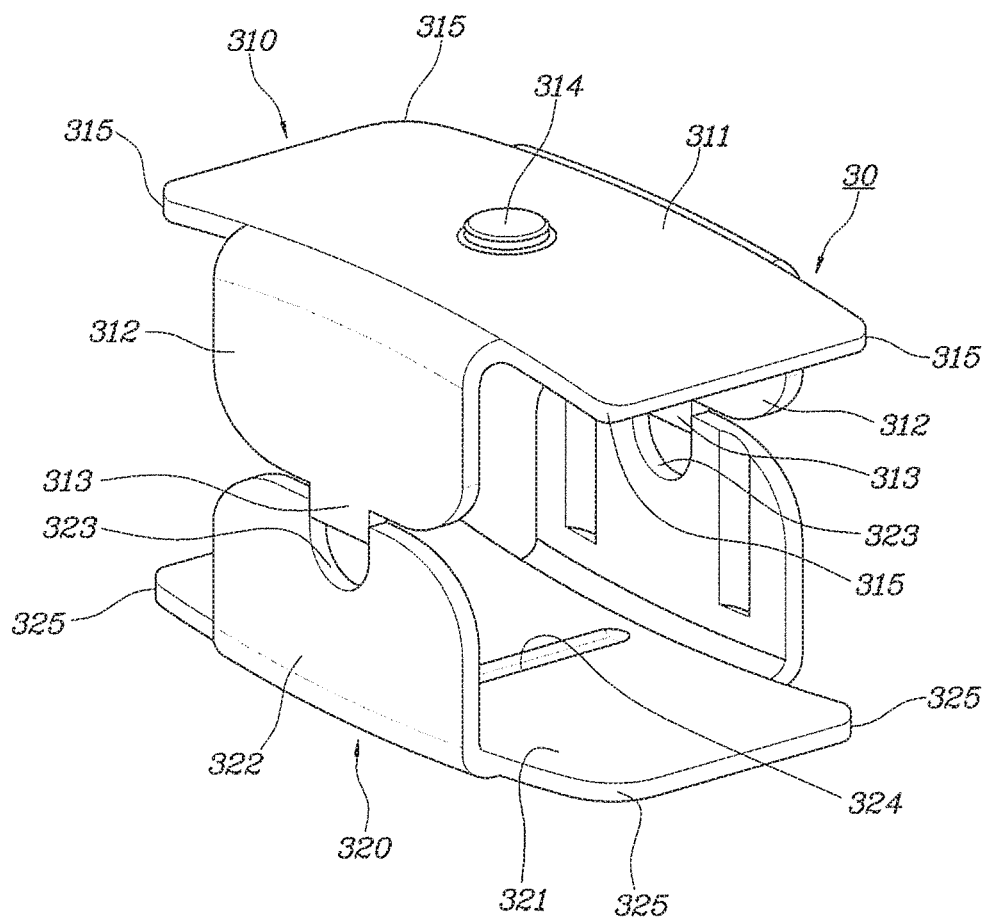
FIG. 5 is a perspective view of the abrasion-preventing pad according to an exemplary embodiment of the present disclosure.
Figure 6:
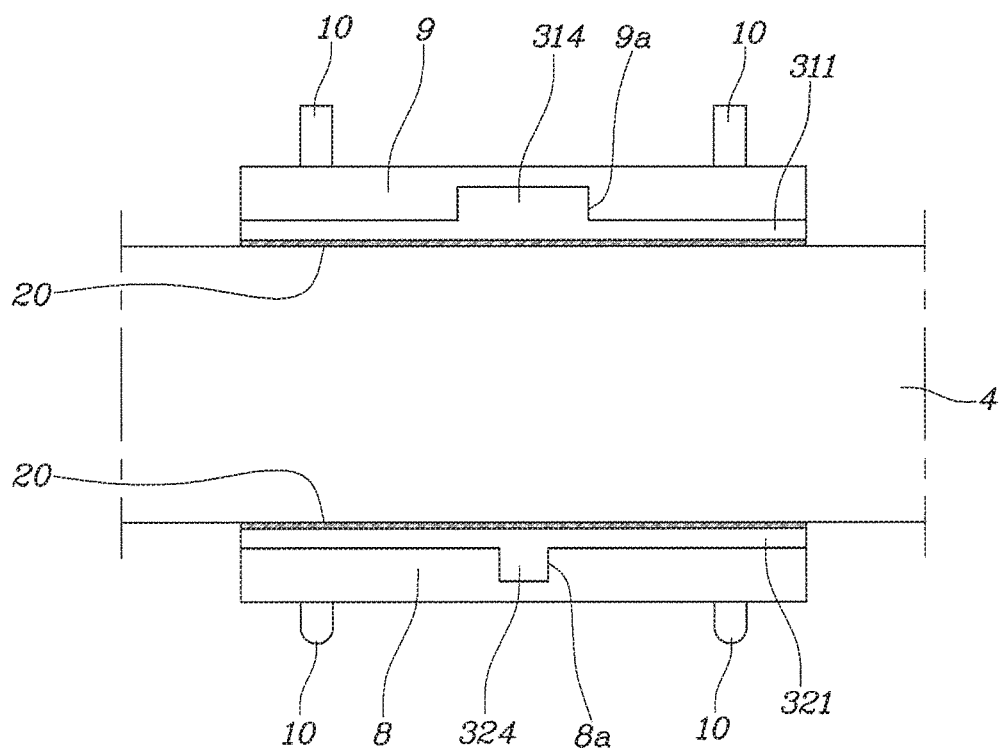
FIG. 6 is a sectional view of a portion of the composite leaf spring to which the abrasion-preventing pad is mounted.

The present disclosure is characterized in that large axial force of the U-bolt 10 is maintained through improvement of abrasion resistance of a portion of the composite leaf spring 4, formed of a mixture of glass fiber and resin, to which the U-bolt 10 is mounted, thereby increasing the durability of the composite leaf spring 4. To this end, the embodiment of the present disclosure, as shown in FIGS. 3 to 5, includes a protective member 20, which has a high degree of hardness and high abrasion, resistance and which is provided to cover the outer surface of the composite leaf spring 4, and an abrasion-preventing pad 30, which is coupled to the composite leaf spring 4 in order to shield the protective member 20. The protective member 20 and the abrasion-preventing pad 30 are positioned at a portion of the composite leaf spring 4 to which the U-bolt 10 is mounted.

That is, in order to prevent the axial force of the U-bolt 10 from decreasing due to abrasion of the composite leaf spring 4, the protective member 20 having a high degree of hardness and high abrasion resistance covers portion of the composite leaf spring 4 to which the U-bolt 10 is mounted, and the abrasion-preventing pad 30 is coupled to the outer surface of the protective member 20. Accordingly, using the protective member 20 and the abrasion-preventing pad 30, it is possible to maintain a large axial force of the U-bolt 10 by improving the abrasion resistance of a portion of the composite leaf spring 4 to which the U-bolt 10 is mounted, consequently increasing the durability of the composite leaf spring 4.

The protective member 20 and the abrasion-preventing pad 30 also have an advantage of preventing the composite leaf spring 4 from being damaged due to chipping by external foreign substances, for example, stones, while the vehicle is traveling.

The protective member 20 is formed of an aramid fabric material, and is integrally stacked on each of the top surface and the bottom surface of the composite leaf spring 4 when the composite leaf spring 4 is manufactured using a mixture of glass fiber and resin.

The most common method of manufacturing the composite leaf spring 4 is a prepreg-manufacturing method, which includes steps of forming glass fiber prepregs, stacking the same on one another, and processing the stacked glass fiber prepregs through a high-pressure press. The protective member 20 formed of an aramid fabric material is stacked on each of the top surface and the bottom surface of the composite leaf spring which is manufactured through the prepreg-manufacturing method.

The protective member 20 may be stacked only on each of the top surface and the bottom surface of a portion of the composite leaf spring 4 to which the U-bolt 10 is mounted, or may further cover each of the two side surfaces in addition to the to and bottom surfaces of the composite leaf spring 4.

The abrasion-preventing pad 30 is formed of a polyamide material having high abrasion resistance. The abrasion-preventing pad 30 includes an upper pad 310 and a lower pad 320, which are coupled to the composite leaf spring 4 in order to respectively shield the top surface and the bottom surface of the composite leaf spring 4. The upper pad 310 and the lower pad 320 are connected to each other, and the connecting portions therebetween are positioned on the side surfaces of the composite leaf spring 4.

The upper pad 310 and the lower pad 320 may respectively be coupled to the top surface and the bottom surface of the composite leaf spring 4 through a coupling method such as bonding.

The upper pad 310 includes a base portion 311, which covers the top surface of the composite leaf spring 4, and a side cover portion 312, which is bent and extended from the base portion 311 and covers each of the two opposite side surfaces of the composite leaf spring 4. The lower pad 320 includes a base portion 321, which covers the bottom surface of the composite leaf spring 4, and a side cover portion 322, which is bent and extended from the base portion 321 and covers each of the two opposite side surfaces of the composite leaf spring 4. One of the side cover portion 312 of the upper pad 310 and the side cover portion 322 of the lower pad 320 has a clamping protrusion 313, and the remaining one thereof has a clamping recess 323 formed therein. The upper pad 310 and the lower pad 320 are connected to each other through coupling of the clamping protrusion 313 and the clamping recess 323.

the upper pad 310 and the lower pad 320 are connected to each other using only the clamping protrusion 313 and the clamping recess 323, and portions other than the clamping protrusion 313 and the clamping recess 323 of the upper pad 310 and the lower pad 320 are spaced predetermined distance C1 apart from each other in order to allow thermal expansion in response to a change in temperature.

The base portion 311 of the upper pad 310 has an upper protrusion 314 for preventing slippage of the upper pad 310, which protrudes toward the spring bracket 9. The base portion 321 of the lower pad 320 has a lower protrusion 324 for preventing slippage of the lower pad 320, which protrudes toward the U-bolt saddle 8. When the U-bolt 10 is mounted to the composite leaf spring, the upper protrusion 314 is inserted into an insertion hole 9a formed in the spring bracket 9 and the lower protrusion 324 is inserted into an insertion hole 8a formed in the U-bolt saddle 8, thereby preventing slippage of the upper pad 310 and the lower pad 320.

Further, each of the base portion 311 of the upper pad 310 and the base portion 321 of the lower pad 320 has a rectangular shape that extends in the longitudinal direction of the composite leaf spring 4 so as to respectively cover relatively large areas of the top surface and the bottom surface of the composite leas spring 4. Furthermore, the base portion 311 of the upper pad 310 and the base portion 321 of the lower pad 320 have rounded corners 315 and 325 in order to prevent the composite leaf spring 4 from being damaged when the composite leaf spring 4 is twisted.

As is apparent from the above description, in a suspension system for a vehicle including a composite leaf spring according to the embodiment of the present disclosure, a protective member having a high degree of hardness and high abrasion resistance is provided so as to be integrally stacked on a portion of a composite leaf spring that is formed of a mixture of glass fiber and resin and to which a U-bolt is mounted, and an abrasion-preventing pad is coupled to the outer surface of the protective member in order to shield the same. Accordingly, using the protective member and the abrasion-preventing pad, it is possible to maintain a large axial force of the U-bolt by improving the abrasion resistance of the portion of the composite leaf spring to which the U-bolt is mounted, consequently increasing the durability of the composite leaf spring.

In addition, the protective member and the abrasion-preventing pad according to the present disclosure also have an effect of preventing the composite leaf spring from being damaged due to chipping by external foreign substances, such as stones, while the vehicle is traveling.

Although the exemplary embodiment of the present disclosure has been disclosed for illustrative purposes those skilled in the art will appreciate that various modifications, additions, and substitutions are possible, without departing from the scope and spirit of the invention as disclosed in the accompanying claims.

What is claimed is:

1. A suspension system for a vehicle, the suspension system comprising:
   a composite leaf spring including a protective member which covers an outer surface of the composite leaf spring; and
   an abrasion-preventing pad coupled to the composite leaf spring and shielding the protective member, the abrasion-preventing pad including an upper pad and a lower pad,
   wherein the protective member and the abrasion-preventing pad are disposed at a portion of the composite leaf spring to which a U-bolt is mounted,
   wherein the upper pad and the lower pad are coupled to the composite leaf spring to respectively shield a top surface and a bottom surface of the composite leaf spring,
   wherein the upper pad and the lower pad are connected to each other such that connecting portions therebetween are disposed on side surfaces of the composite leaf spring,
   wherein the upper pad includes a first base portion having an upper protrusion for preventing slippage of the upper pad,
   wherein the lower pad includes a second base portion having a lower protrusion for preventing slippage of the lower pad, and
   wherein the U-bolt is mounted to the composite leaf spring, the upper protrusion is disposed in an insertion hole of a spring bracket, and the lower protrusion is inserted into an insertion hole of a U-bolt saddle, to prevent slippage of the upper pad and the lower pad.

2. The suspension system according to claim 1, wherein the protective member is composed of an aramid fabric material and is integrally stacked on each of the top surface and the bottom surface of the composite leaf spring, and
   wherein the composite leaf spring includes a mixture of glass fiber and resin.

3. The suspension system according to claim 1, wherein the abrasion-preventing pad is composed of a polyamide material having abrasion resistance.

4. The suspension system according to claim 3, wherein each of the first base portion and the second base portion has a rectangular shape, extends in a longitudinal direction of the composite leaf spring to respectively cover areas of the top surface and the bottom surface of the composite leaf spring, and has a round corner which prevents the composite leaf spring from being damaged when the composite leaf spring is twisted.

5. The suspension system according to claim 1,
   wherein the first base portion and the second base portion cover the top surface and the bottom surface of the composite leaf spring, respectively,
   wherein the upper pad further includes at least one first side cover portion bent and extending from the first base portion to cover at least one of the side surfaces of the composite leaf spring,
   wherein the lower pad further includes at least one second side cover portion bent and extending from the second base portion to cover the at least one of the side surfaces of the composite leaf spring, wherein one of the at least one first side cover portion and the at least one second side cover portion has a clamping protrusion, and the remaining one of the at least one first side cover portion and the at least one second side cover portion has a clamping recess therein, and wherein the upper pad and the lower pad are connected to each other through coupling of the clamping protrusion and the clamping recess.

6. The suspension system according to claim 5, wherein the upper pad and the lower pad are connected to each other using only the clamping protrusion and the clamping recess, and wherein portions other than the clamping protrusion and the clamping recess are spaced apart from each other in order to allow thermal expansion in response to a change in temperature.

* * * * *